US011970880B2

(12) United States Patent
Lin et al.

(10) Patent No.: US 11,970,880 B2
(45) Date of Patent: Apr. 30, 2024

(54) ELECTRIC LOCK AND CLUTCH MECHANISM THEREOF

(71) Applicant: Taiwan Fu Hsing Industrial Co., Ltd., Kaohsiung (TW)

(72) Inventors: Yu-Cheng Lin, Tainan (TW); Jiun-Nan Shiu, Kaohsiung (TW)

(73) Assignee: Taiwan Fu Hsing Industrial Co., Ltd., Kaohsiung (TW)

( * ) Notice: Subject to any disclaimer, the term of this patent is extended or adjusted under 35 U.S.C. 154(b) by 181 days.

(21) Appl. No.: 17/466,069

(22) Filed: Sep. 3, 2021

(65) Prior Publication Data

US 2022/0178170 A1 Jun. 9, 2022

(30) Foreign Application Priority Data

Dec. 9, 2020 (TW) ................................ 109143479

(51) Int. Cl.
*E05B 47/00* (2006.01)
*E05B 47/06* (2006.01)
*E05B 49/00* (2006.01)

(52) U.S. Cl.
CPC ...... *E05B 47/0012* (2013.01); *E05B 47/0603* (2013.01); *E05B 47/0692* (2013.01); *E05B 2047/0017* (2013.01); *E05B 2047/0023* (2013.01); *E05B 2047/0031* (2013.01); *E05B 49/00* (2013.01)

(58) Field of Classification Search
CPC .. E05B 47/0012; E05B 47/0023; E05B 47/00; E05B 47/06; E05B 47/0603; E05B 47/0676; E05B 47/0692; E05B 2047/0017; E05B 2047/0023; E05B 2047/0026; E05B 2047/0031; E05B 1/003
USPC .................................. 70/472, 218, 222, 283
See application file for complete search history.

(56) References Cited

U.S. PATENT DOCUMENTS

| | | | | |
|---|---|---|---|---|
| 7,874,190 B2 * | 1/2011 | Krisch | ................ | E05B 47/0649 70/277 |
| 9,822,552 B2 | 11/2017 | Eller et al. | | |
| 2004/0207214 A1 * | 10/2004 | Lin | ..................... | E05B 47/0012 292/336.3 |

(Continued)

FOREIGN PATENT DOCUMENTS

| | | |
|---|---|---|
| CN | 105604389 A * | 5/2016 |
| CN | 108086804 A * | 5/2018 |

(Continued)

OTHER PUBLICATIONS

Annotated translation of CN-108086804-A (Year: 2018).*
Annotated Machine translation of CN-105604389-A (Year: 2016).*
Machine translation of CN 110821298 A (Year: 2020).*

*Primary Examiner* — Christine M Mills
*Assistant Examiner* — Peter H Watson
(74) *Attorney, Agent, or Firm* — Best & Flanagan LLP

(57) ABSTRACT

An electric lock includes a housing, a manual control member rotatably affixed to the housing, and a clutch mechanism. The clutch mechanism includes a clutch base rotatably affixed to the housing; a retractable plug arranged on the clutch base, wherein the retractable plug is radially movable relative to the clutch base; a driving member abutting against a first end of the retractable plug; and a motor configured to drive the driving member to move relative to the clutch base toward the shaft of the manual control member.

6 Claims, 6 Drawing Sheets

(56) References Cited

U.S. PATENT DOCUMENTS

2006/0021404 A1* 2/2006 Menta San Miguel ...................... E05B 47/0012 70/472
2016/0053509 A1* 2/2016 Shiu .................... E05B 47/0649 292/336.3

FOREIGN PATENT DOCUMENTS

| | | | | | |
|---|---|---|---|---|---|
| CN | 208236135 U | | 12/2018 | | |
| CN | 110821298 A | * | 2/2020 | ............... | E05B 3/00 |
| CN | 212027424 U | | 11/2020 | | |
| TW | 489892 U | | 6/2002 | | |
| TW | 201439419 A | | 10/2014 | | |

* cited by examiner

ELECTRIC LOCK AND CLUTCH MECHANISM THEREOF

BACKGROUND OF THE INVENTION

1. Field of the Invention

The present invention relates to an electric lock, and more particularly, to an electric lock with an improved clutch mechanism.

2. Description of the Prior Art

Generally, an electric lock has a clutch mechanism configured to control linkage between a handle and a latch. For example, when a user enters a correct password, the clutch mechanism links the handle to the latch, so that the latch can be moved when the handle is rotated; when the user enters an incorrect password, the clutch mechanism does not link the handle to the latch, so that the latch is not moved when the handle is rotated. However, when the handle is rotated before the clutch mechanism completely links the handle to the latch, internal components of the clutch mechanism may interfere with a corresponding structure of the handle to further cause damages on the clutch mechanism. The electric lock of the prior art can not avoid the clutch mechanism from being damaged due to the aforementioned situation.

SUMMARY OF THE INVENTION

The present invention provides an electric lock and a clutch mechanism thereof in order to solve the problems of the prior art.

An electric lock of the present invention comprises a housing, a manual control member and a clutch mechanism. The manual control member is rotatably affixed to the housing, and a shaft of the manual control member is formed with a groove. The clutch mechanism comprises a clutch base rotatably affixed to the housing; a retractable plug arranged on the clutch base and radially movable relative to the clutch base; a driving member abutting against a first end of the retractable plug; and a motor configured to drive the driving member to move relative to the clutch base toward the shaft of the manual control member.

A clutch mechanism of an electric lock of the present invention comprises a clutch base rotatably affixed to a housing of the electric lock; a retractable plug arranged on the clutch base and radially movable relative to the clutch base; a driving member abutting against a first end of the retractable plug; and a motor configured to drive the driving member to move relative to the clutch base, to move a second end of the retractable plug to be protruded from the clutch base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
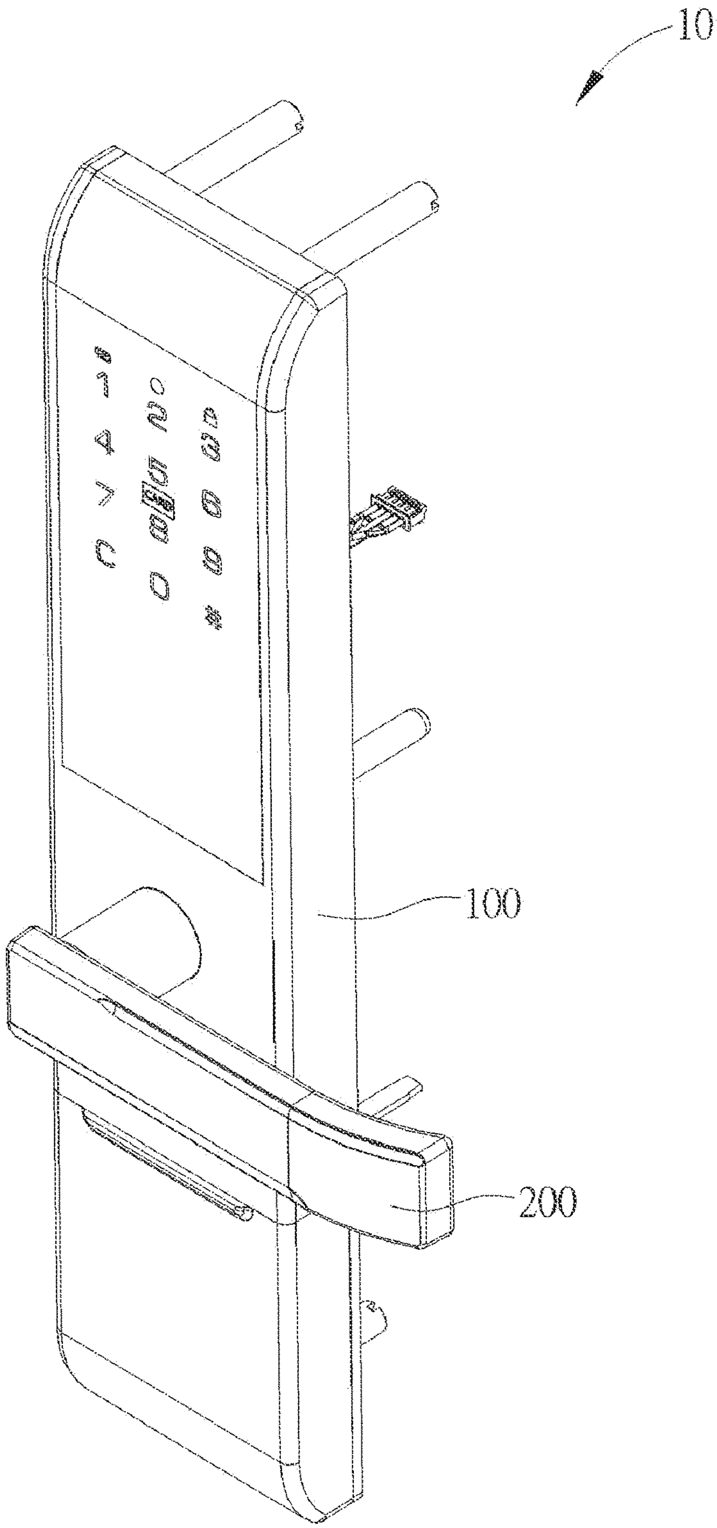
FIG. 1 is a diagram showing an electric lock of the present invention.
Figure 2:
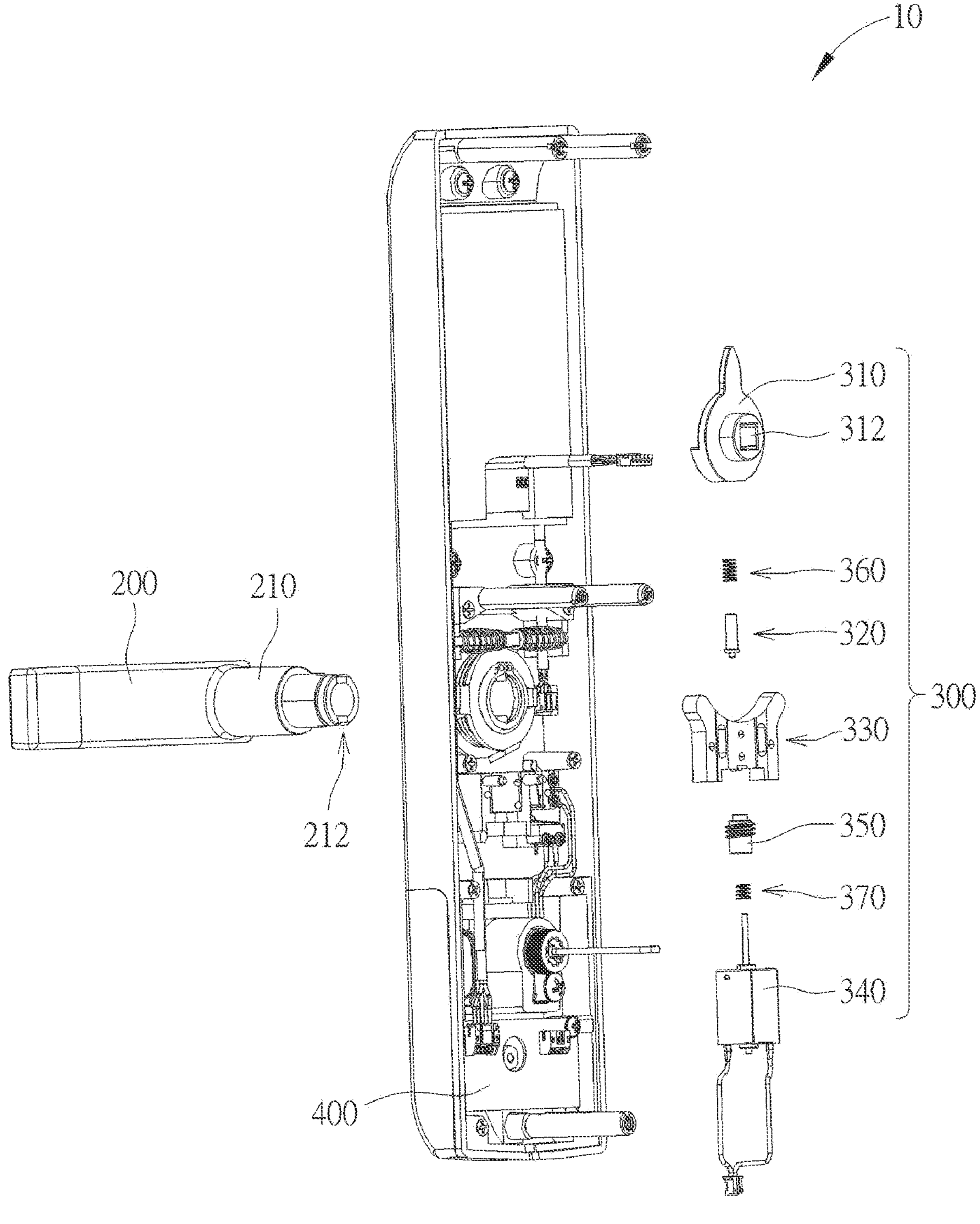
FIG. 2 is an exploded view of the electric lock of the present invention.
Figure 3:
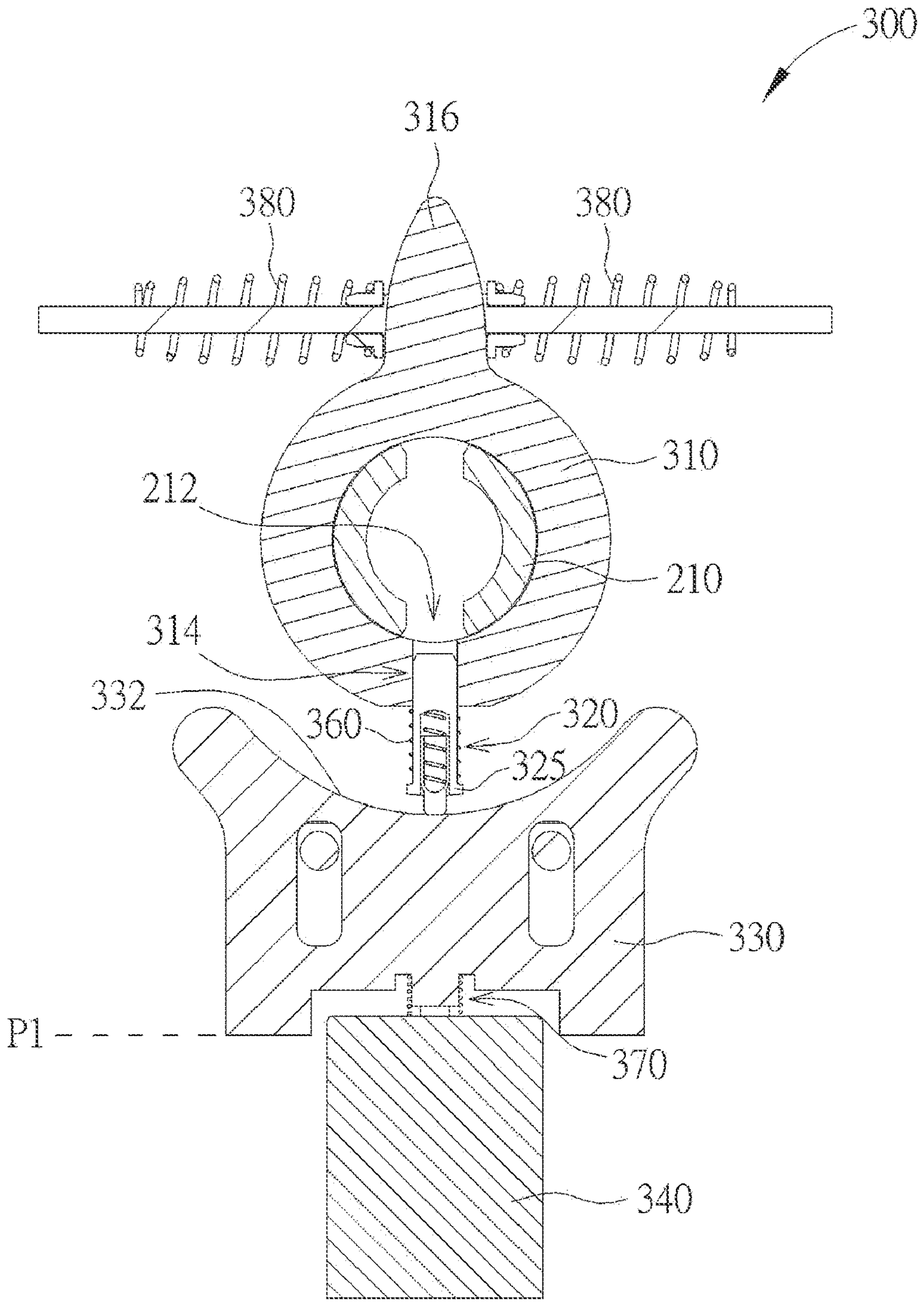
FIG. 3 is a diagram showing a clutch mechanism of the electric lock of the present invention.
Figure 4:
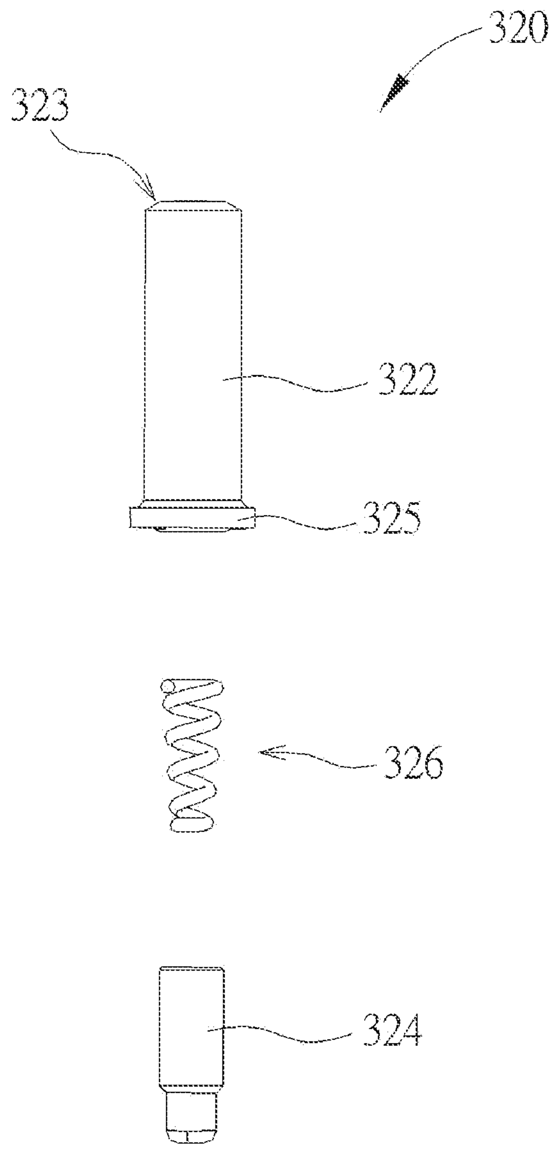
FIG. 4 is an exploded view of a retractable plug of the electric lock of the present invention.

Please refer to FIG. 1 to FIG. 4. FIG. 1 is a diagram showing an electric lock of the present invention. FIG. 2 is an exploded view of the electric lock of the present invention. FIG. 3 is a diagram showing a clutch mechanism of the electric lock of the present invention. FIG. 4 is an exploded view of a retractable plug of the electric lock of the present invention. As shown in figures, the electric lock 10 of the present invention comprises a housing 100, a manual control member 200, a clutch mechanism 300 and a control circuit 400. The manual control member 200 is rotatably affixed to the housing 100. The manual control member 200 has a shaft 210, and the shaft 210 is formed with a groove 212. The clutch mechanism 300 is configured to perform unlocking operation or locking operation according to control signals of the control circuit 400. For example, when a user enters a correct password, the clutch mechanism 300 links the manual control member 200 to a latch (not shown in figures) of the electric lock 10, so that the latch can be moved when the manual control member 200 is rotated; when the user enters an incorrect password, the clutch mechanism 300 does not link the manual control member 200 to the latch of the electric lock 10, so that the latch is not moved when the manual control member 200 is rotated.

The clutch mechanism 300 comprises a clutch base 310, a retractable plug 320, a driving member 330 and a motor 340. The clutch base 310 is rotatably affixed to the housing 100. In the present embodiment, the clutch base 310 has a transmission hole 312 configured to fit to a transmission rod (not shown in figures), so that the clutch base 310 can be connected to the latch of the electric lock 10 through the transmission rod. When the clutch base 310 is rotated, the transmission rod is driven by the clutch base 310 to move the latch between an unlocking position and a locking position. The retractable plug 320 is arranged on the clutch base 310 and is radially movable relative to the clutch base 310. In the present embodiment, the retractable plug 320 passes through a through hole 314 of the clutch base 310 to be radially movable relative to the clutch base 310, but the present invention is not limited thereto. The retractable plug 320 comprises a main body 322, a push rod 324 and an elastic member 326. The push rod 324 is movably arranged on the main body 322. The elastic member 326 is arranged between the main body 322 and the push rod 324, and configured to provide an elastic force to the push rod 324 to push the push rod 324 to be protruded relative to the main body 322. Two opposite ends of the retractable plug 320 are ends of the main body 322 and the push rod 324 respectively. In addition, when the two ends of the retractable plug 320 are pressed, the push rod 324 is retracted into the main body 322 to shorten the retractable plug 320. The driving member 330 abuts against one end of the retractable plug 320. In the present embodiment, the driving member 330 abuts against the push rod 324 of the retractable plug 320, but the present invention is not limited thereto. The motor 340 is configured to drive the driving member 330 to move relative to the clutch base 310. In the present embodiment, the clutch mechanism 300 further comprises a screw rod 350 connected to the shaft of the motor 340 in order to rotate with the shaft of the motor 340. Furthermore, the driving member 330 is internally formed with a thread structure (now shown in figures) corresponding to the screw rod 350. As such, when the shaft of the motor 340 is rotated, the driving member 330 is driven by the screw rod 350 to move toward the clutch base 310 or move away from the clutch base 310.

Figure 5:
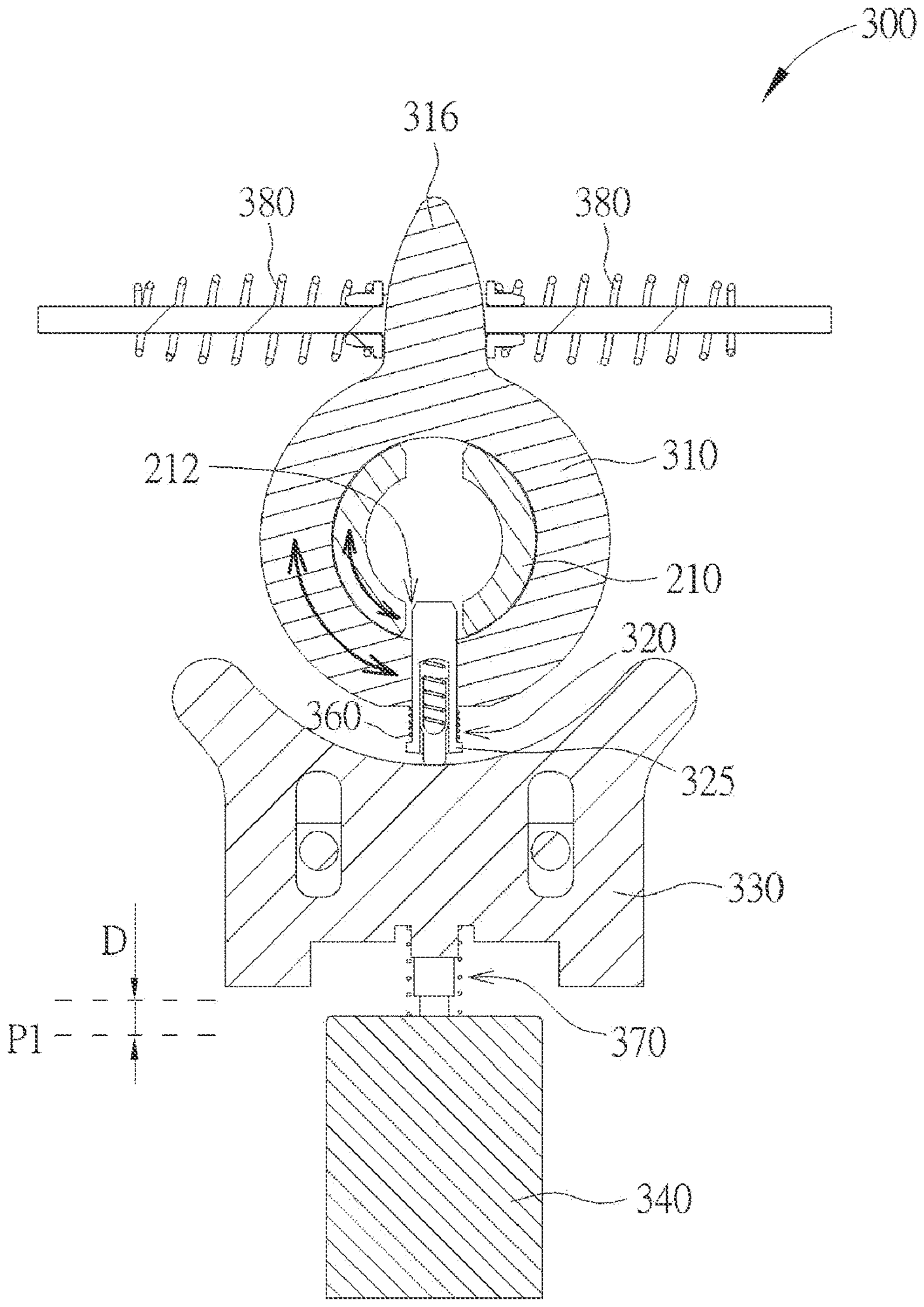
FIG. 5 is a diagram showing the clutch mechanism of the electric lock of the present invention being linked to the manual control member.

Please refer to FIG. 5, and refer to FIG. 1 to FIG. 4 as well. FIG. 5 is a diagram showing the clutch mechanism of the electric lock of the present invention being linked to the manual control member. When the clutch mechanism 300 performs the unlocking operation, the motor 340 drives the driving member 330 through the screw rod 350 to move from an initial position P1 toward the clutch base 310, so as to push the retractable plug 320 to move relative to the clutch base 310 toward the shaft 210 of the manual control member 200, such that the main body 322 of the retractable plug 320 is protruded from the clutch base 310. When the driving member 330 is moved from the initial position P1 toward the clutch base 310 greater than or equal to a predetermined distance D, the main body 322 of the retractable plug 320 is inserted into the groove 212 on the shaft 210 of the manual control member 200, so as to link the clutch mechanism 300 and the manual control member 200. As such, when the manual control member 200 is rotated, the clutch base 310 is synchronously rotated with the manual control member 200 to further move the latch. On the other hand, the driving member 330 has an arc surface 332. When the clutch base 310 is synchronously rotated with the manual control member 200, the arc surface 332 of the driving member 330 is configured to abut against the push rod 324 of the retractable plug 320 so as to prevent the retractable plug 320 from moving away from the groove 212 on the shaft 210 of the manual control member 200 when the clutch base 310 is rotated. Moreover, the clutch mechanism 300 further comprises a pair of return springs 380 respectively abutting against two sides of a driven part 316 of the clutch base 310. The return spring 380 is configured to drive the clutch base 310 to move back to a position prior to the rotation after the manual control member 200 is released.

Figure 6:
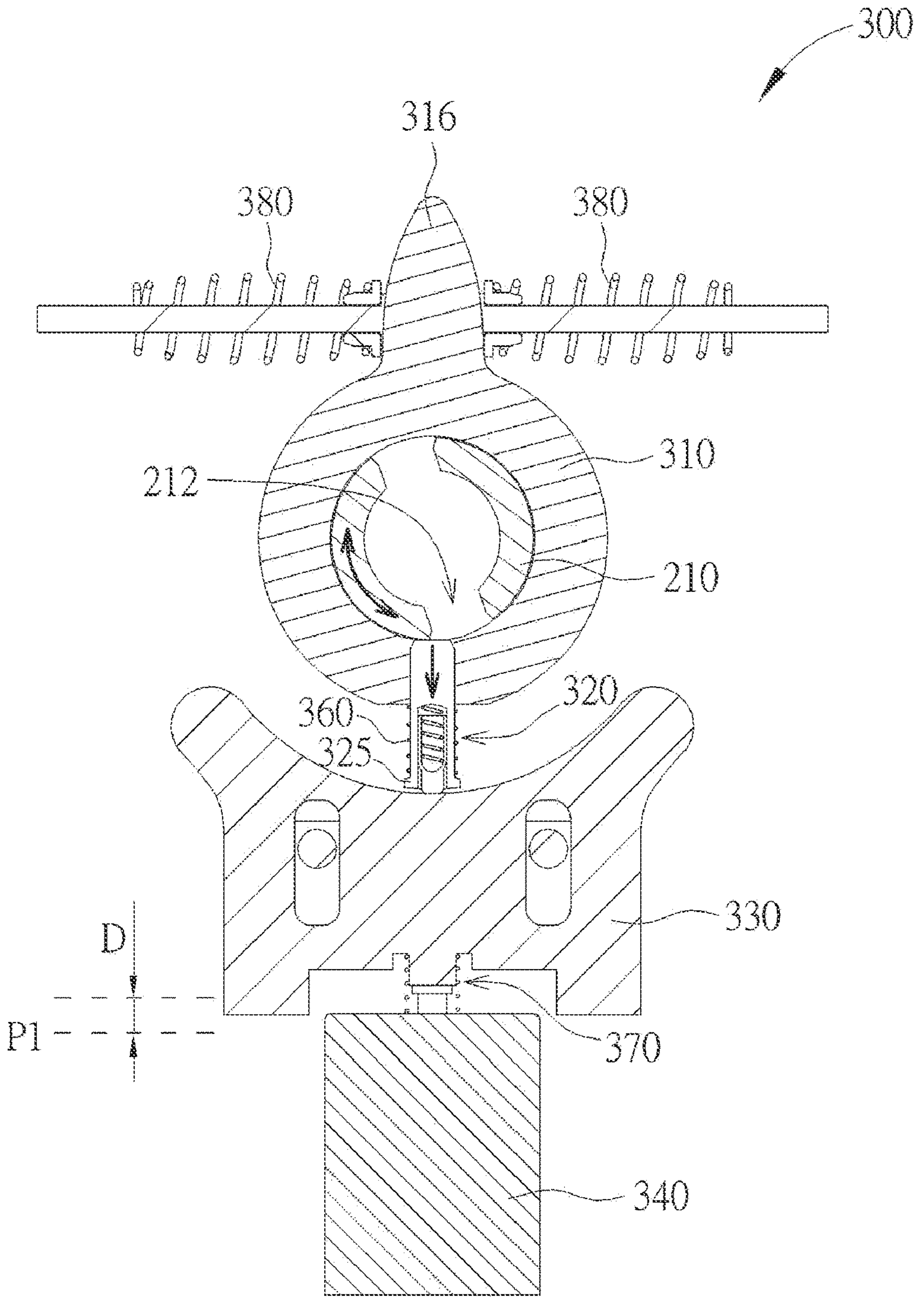
FIG. 6 is a diagram showing the clutch mechanism of the electric lock of the present invention without being linked to the manual control member.

Please refer to FIG. 6, and FIG. 1 to FIG. 4 as well. FIG. 6 is a diagram showing the clutch mechanism of the electric lock of the present invention without being linked to the manual control member. When the clutch mechanism 300 performs the unlocking operation, the motor 340 drives the driving member 330 through the screw rod 350 to move from the initial position P1 toward the clutch base 310, so as to push the retractable plug 320 to move relative to the clutch base 310 toward the shaft 210 of the manual control member 200, such that the main body 322 of the retractable plug 320 is protruded from the clutch base 310. When the driving member 330 is moved from the initial position P1 toward the clutch base 310 less than the predetermined distance D, the main body 322 of the retractable plug 320 has not been stably inserted into the groove 212 on the shaft 210 of the manual control member 200, so that the clutch mechanism 300 is not linked to the manual control member 200. In such state, when the manual control member 200 is rotated, the shaft 210 of the manual control member 200 abuts against the main body 322 of the retractable plug 320, so that the push rod 324 of the retractable plug 320 is forced to abut against the arc surface 332 of the driving member 330. In other words, both ends of the retractable plug 320 are pressed, such that the retractable plug 320 is shortened in length (the elastic member 326 is in a pressed state).

According to the aforementioned arrangement, when the clutch mechanism 300 of the electric lock 10 has not been linked to the manual control member 200 during the unlocking operation, the retractable plug 320 can be shortened in length to prevent structural interference between the clutch mechanism 300 and the manual control member 200 (caused by turning the manual control member 200 prematurely). In other words, the retractable plug 320 can prevent the clutch mechanism 300 from being damaged due to improper operation during the unlocking operation.

On the other hand, the main body 322 of the retractable plug 320 is formed with a guiding structure 323. The guiding structure 323 is configured to guide the shaft 210 of the manual control member 200 to press the main body 322 when the shaft 210 of the manual control member 200 abuts against the main body 322. In the present embodiment, the guiding structure 323 has an inclined surface, but the present invention is not limited thereto. In other embodiments of the present invention, the guiding structure 323 can have an arc surface.

In addition, the clutch mechanism 300 further comprises a first spring 360 and a second spring 370. The main body 322 of the retractable plug 320 is formed with a flange 325. The first spring 360 is arranged on the retractable plug 320 and configured to abut against the clutch base 310 (or arranged between the flange 325 and the clutch base 310) to push the retractable plug 320 away from the clutch base 310, such that the retractable plug 320 can be moved away from the shaft 210 of the manual control member 200 after the unlocking operation. The second spring 370 is arranged between the driving member 330 and the motor 340 and configured to elastically buffer the driving member 330, such that the thread structures of the driving member 330 and the screw rod 350 can be stably fit.

In contrast to the prior art, the clutch mechanism of the electric lock of the present invention has a simpler structure to reduce space occupied by the clutch mechanism. Therefore, the electric lock of the present invention has greater design flexibility. Moreover, the clutch mechanism of the electric lock of the present invention has the retractable plug with a variable length to prevent the clutch mechanism from being damaged due to improper operation during the unlocking operation (such as an abnormal situation of the motor continuously rotating to cause damages of the screw rod and the corresponding thread structure), and thereby improves reliability of the electric lock.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric lock, comprising:
- a housing;
- a manual control member rotatably affixed to the housing, wherein a shaft of the manual control member is formed with a groove; and
- a clutch mechanism, comprising:
  - a clutch base rotatably affixed to the housing;
  - a retractable plug arranged on the clutch base and radially movable relative to the clutch base;
  - a driving member located outside the manual control member and has an arc surface configured to abut against a first end of the retractable plug; and a motor configured to drive the driving member to move relative to the clutch base toward the shaft of the manual control member;

wherein a second end of the retractable plug is formed with a guiding structure, and the guiding structure has an arc surface or an inclined surface, wherein a length defined between the first end and the second end of the retractable plug is variable;

wherein a chamfer is formed at an edge of the groove and corresponding to the guiding structure;

wherein when the motor drives the driving member to move from an initial position toward the clutch base less than a predetermined distance and when the manual control member is rotated, the shaft of the manual control member is configured to abut against the second end of the retractable plug to shorten the retractable plug;

wherein when the motor drives the driving member to move from the initial position toward the clutch base greater than or equal to the predetermined distance and when the manual control member is rotated, the second end of the retractable plug is inserted into the groove, so that the clutch base is synchronously rotated with the manual control member.

2. The electric lock of claim 1, wherein the retractable plug comprises:

a main body;

a push rod movably arranged on the main body; and an elastic member arranged between the main body and the push rod, and configured to push the push rod to be protruded relative to the main body.

3. The electric lock of claim 1, wherein the clutch mechanism further comprises:

a first spring arranged on the retractable plug and configured to abut against the clutch base to push the retractable plug away from the clutch base; and a second spring arranged between the driving member and the motor, and configured to elastically buffer the driving member.

4. The electric lock of claim 1, wherein the clutch mechanism further comprises a screw rod connected to the motor, and the driving member is formed with a thread structure corresponding to the screw rod.

5. The electric lock of claim 1, wherein the clutch base is configured to be connected to a latch through a transmission rod; wherein when the clutch base is rotated, the transmission rod is driven by the clutch base to move the latch.

6. An electric lock, comprising:

a housing;

a manual control member rotatably affixed to the housing, wherein a shaft of the manual control member is formed with a groove; and a clutch mechanism, comprising:

a clutch base rotatably affixed to the housing;

a retractable plug arranged on the clutch base and radially movable relative to the clutch base;

a driving member located outside the manual control member and has an arc surface configured to abut against a first end of the retractable plug; and a motor configured to drive the driving member to move relative to the clutch base toward the shaft of the manual control member;

wherein a second end of the retractable plug is formed with a guiding structure, and the guiding structure has an arc surface or an inclined surface, wherein a length defined between the first end and the second end of the retractable plug is variable;

wherein a chamfer is formed at an edge of the groove and corresponding to the guiding structure;

wherein the clutch base is configured to be connected to a latch through a transmission rod;

wherein when the clutch base is rotated, the transmission rod is driven by the clutch base to move the latch.

* * * * *